United States Patent
Ponyavin et al.

(10) Patent No.: US 10,801,406 B2
(45) Date of Patent: Oct. 13, 2020

(54) INLET BLEED HEAT SYSTEM FOR USE IN A TURBINE ENGINE

(71) Applicant: General Electric Company, Schenectady, NY (US)

(72) Inventors: Valery Ivanovich Ponyavin, Greenville, SC (US); Bradly Aaron Kippel, Greenville, SC (US); Laxmikant Merchant, Karnataka (IN); Hua Zhang, Greer, SC (US); Naveen Parmeshwar, Greenville, SC (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 15/636,811

(22) Filed: Jun. 29, 2017

(65) Prior Publication Data

US 2019/0003387 A1 Jan. 3, 2019

(51) Int. Cl.
| | | |
|---|---|---|
| F02C 7/047 | (2006.01) | |
| F04D 29/66 | (2006.01) | |
| F04D 27/02 | (2006.01) | |
| F02C 6/08 | (2006.01) | |
| F02C 9/18 | (2006.01) | |
| F04D 29/58 | (2006.01) | |
| F02C 7/24 | (2006.01) | |
| F02C 7/045 | (2006.01) | |
| F04D 29/70 | (2006.01) | |
| F04D 29/02 | (2006.01) | |

(52) U.S. Cl.
CPC ............... *F02C 7/047* (2013.01); *F02C 6/08* (2013.01); *F02C 7/045* (2013.01); *F02C 7/24* (2013.01); *F02C 9/18* (2013.01); *F04D 27/0215* (2013.01); *F04D 29/5853* (2013.01); *F04D 29/663* (2013.01); *F04D 29/023* (2013.01); *F04D 29/701* (2013.01); *F05D 2220/32* (2013.01); *F05D 2260/231* (2013.01); *F05D 2300/611* (2013.01)

(58) Field of Classification Search
CPC .. F02C 7/047; F02C 7/045; F02C 7/24; F02C 7/14; F02C 7/141; F02C 7/143; F05D 2260/231; F01D 9/06; F01D 9/065
See application file for complete search history.

(56) References Cited

U.S. PATENT DOCUMENTS

| | | |
|---|---|---|
| 8,083,466 B2 | 12/2011 | Zhang et al. |
| 9,359,951 B2 * | 6/2016 | Merchant ................ F02C 7/045 |
| 9,771,865 B2 * | 9/2017 | Merchant ................ F02C 7/045 |
| 2016/0115870 A1 * | 4/2016 | Merchant ................ F02C 7/045 |

* cited by examiner

Primary Examiner — J. Todd Newton
Assistant Examiner — John S Hunter, Jr.
(74) Attorney, Agent, or Firm — Armstrong Teasdale LLP

(57) ABSTRACT

An inlet bleed heat (IBH) system for use in a turbine engine including a silencer assembly. The inlet bleed heat (IBH) system includes a feed pipe for delivering compressor discharge air. The feed pipe includes a plurality of orifices along at least a portion of a length of the feed pipe, and each orifice of the plurality of orifices extends through a wall of the feed pipe for allowing the compressor discharge air to exit the feed pipe. The system also includes a heat shielding component that extends across the feed pipe, wherein the heat shielding component is configured to reduce heat transfer between the feed pipe and the silencer assembly of the turbine engine.

14 Claims, 5 Drawing Sheets

INLET BLEED HEAT SYSTEM FOR USE IN A TURBINE ENGINE

BACKGROUND

The embodiments described herein relate generally gas turbine engines and, more particularly, to inlet heating systems for gas turbine engines.

The combustion system of gas turbine engines generates hot gases to drive a turbine. The turbine drives a compressor that compresses air for combustion in the combustion system and produces usable output power. In at least some gas turbine engines, there are instances during operation where the gas turbine pressure ratio reaches the operating pressure ratio limit of the compressor, resulting in compressor surge. The compressor pressure ratio is typically larger than the turbine pressure ratio in that the latter is subject to pressure loss in the turbine combustor. To provide compressor ratio protection, at least some gas turbine engines recirculate compressor discharge air back to the compressor inlet. This method of gas turbine operation, known as inlet bleed heat (IBH) control, raises the inlet temperature of the compressor inlet air by mixing the bleed portion of the hot compressor discharge air with the colder ambient air, thereby reducing the air density and the mass flow to the gas turbine.

In at least some gas turbine engines, a number of supply feed pipes with a number of orifices along their length are positioned across an inlet duct to deliver the bleed flow. The supply feed pipes are typically located downstream but as close as possible to an inlet silencer within the inlet duct, and upstream as far as possible from the compressor inlet. This positioning facilitates thermal mixing of the bleed flow with the inlet airflow to meet system parameters at the compressor inlet. However, the hot compressor discharge air increases the temperature of the downstream portions of the silencer modules nearest the supply feed pipes, which can cause melting of these downstream portions.

BRIEF DESCRIPTION

In one aspect, an inlet bleed heat (IBH) system for use in a turbine engine including a silencer assembly is provided. The inlet bleed heat (IBH) system includes a feed pipe for delivering compressor discharge air. The feed pipe includes a plurality of orifices along at least a portion of a length of the feed pipe, and each orifice of the plurality of orifices extends through a wall of the feed pipe for allowing the compressor discharge air to exit the feed pipe. The system also includes a heat shielding component that extends across the feed pipe, wherein the heat shielding component is configured to reduce heat transfer between the feed pipe and the silencer assembly of the turbine engine.

In another aspect, a turbine engine is provided. The turbine engine includes a compressor including a discharge extraction manifold, and an inlet housing coupled in flow communication with the compressor. The inlet housing includes an inlet silencer assembly, and an inlet bleed heat (IBH) system including a feed pipe coupled in flow communication with the discharge extraction manifold for delivering compressor discharge air. A heat shielding component is coupled to the feed pipe, and the heat shielding component is configured to reduce heat transfer between the feed pipe and the inlet silencer assembly of the turbine engine.

In yet another aspect, a turbine engine is provided. The turbine engine includes a compressor including a discharge extraction manifold and an inlet housing coupled in flow communication with the compressor. The inlet housing includes an inlet bleed heat (IBH) system including a feed pipe coupled in flow communication with the discharge extraction manifold for delivering compressor discharge air, and an inlet silencer assembly including a plurality of silencer panels. Each silencer panel of the plurality of silencer panels includes a tail portion disposed proximate the feed pipe, and each tail portion includes a heat shielding component configured to reduce heat transfer between the feed pipe and the tail portion.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations are identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
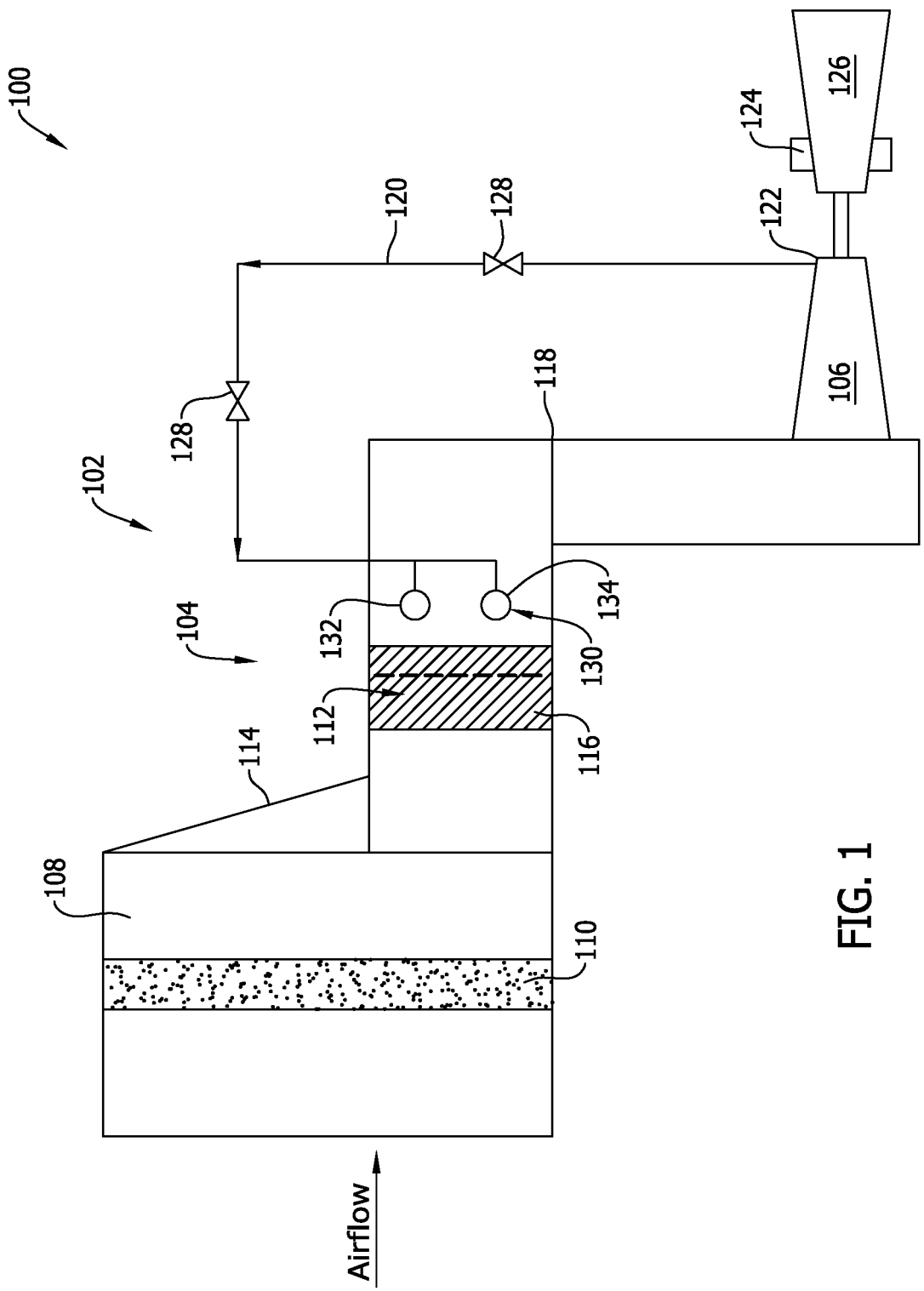
FIG. 1 is a schematic diagram of an exemplary turbine engine.

FIG. 1 is a schematic diagram of a turbine engine 100 including a compressor inlet housing 102. In the exemplary embodiment, compressor inlet housing 102 includes an inlet bleed heat (IBH) system 104 used to protect a gas turbine compressor 106 from icing when operating at reduced inlet guide vane (IGV) angles. In addition, IBH system 104 facilitates reducing compressor pressure ratios at certain operating conditions where additional compressor operating margin is required, facilitates reducing the likelihood of blowout, and facilitates reducing NOx emissions. IBH system 104 is a component system of compressor inlet housing 102. Compressor inlet housing 102 includes, for example, an inlet filter housing 108. Inlet filter housing 108 includes one or more filters 110. In addition, inlet housing 102 includes an inlet silencer assembly 112 disposed downstream of the inlet filter housing 108. Compressor 106 draws an airflow into inlet filter housing 108. A transition duct 114 is coupled in flow communication with inlet filter housing 108 and channels the airflow to a duct 116 that includes inlet silencer assembly 112. A duct 118 channels the airflow downstream of inlet silencer assembly 112 to compressor 106. Compressor 106 channels compressed air to a combustor 124, which combusts an air/fuel mixture. The hot combustion gases are channeled to a turbine 126.

In the exemplary embodiment, a compressor discharge extraction manifold 120 extracts compressor discharge air from a discharge port 122 of compressor 106. The compressor discharge air flows through a number of valves 128, such as an isolation valve and a control valve, to an inlet bleed heat manifold 130. Inlet bleed manifold 130 is disposed downstream of inlet air filter housing 108 and inlet silencer assembly 112. Inlet bleed manifold 130 includes a plurality of feed pipes 132 and 134 for delivering the compressor discharge air to a location within compressor inlet housing 102. Each feed pipe 132 and 134 is coupled in direct flow communication with compressor discharge extraction manifold 120, and extends across duct 116 or other location of compressor inlet housing 102 downstream of inlet silencer assembly 112, e.g., duct 118.

Figure 2:
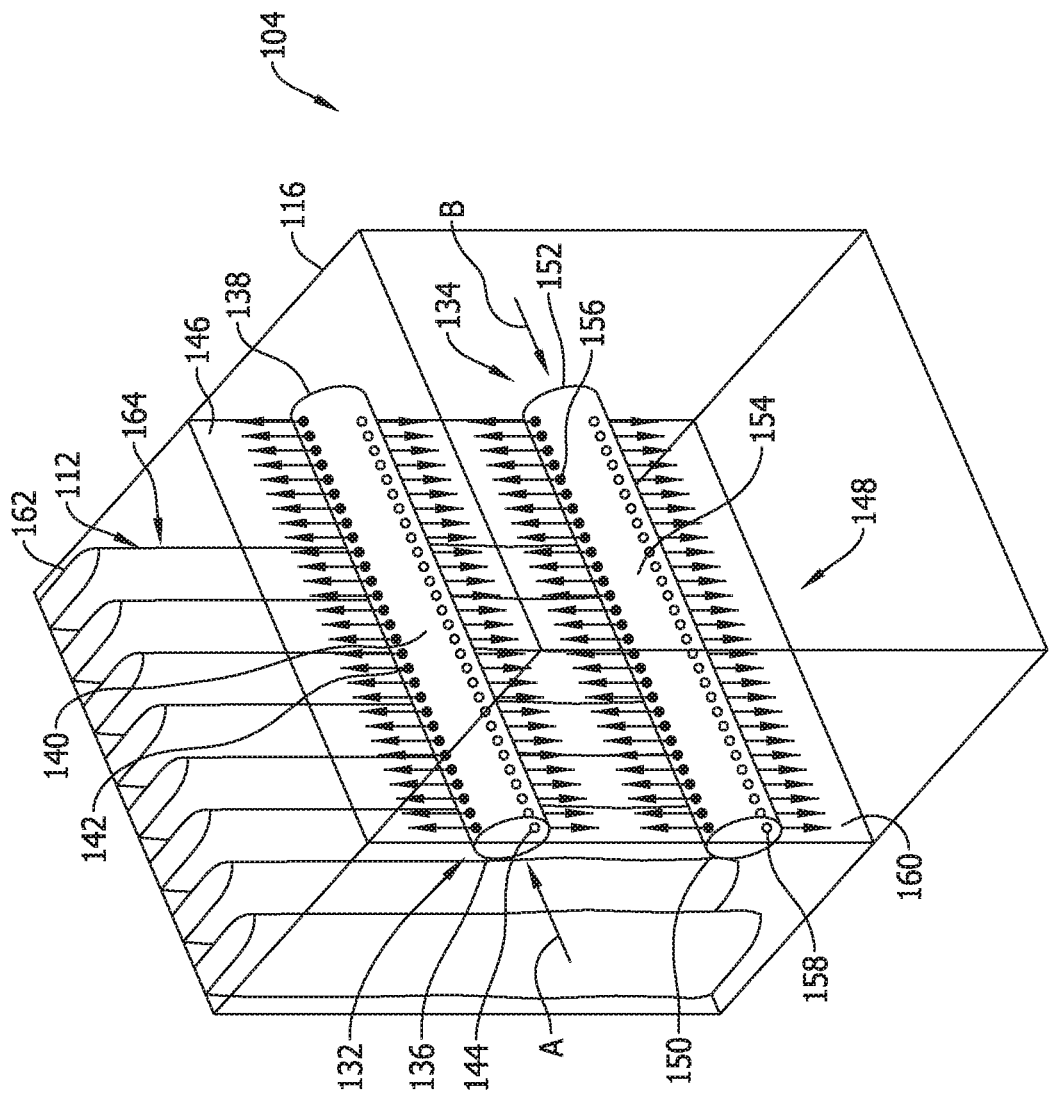
FIG. 2 is a schematic perspective view of an exemplary inlet bleed heat system that may be used in the turbine engine shown in FIG. 1.

FIG. 2 is a schematic perspective view of IBH system 104 positioned within duct 116 of inlet housing 102. In the exemplary embodiment, IBH system 104 includes a first feed pipe 132 having a first end section 136 that extends to a second end section 138 through an intermediate section 140. First feed pipe 132 includes a first plurality of openings 142 and an opposing second plurality of openings 144. With this arrangement, first feed pipe 132 establishes a first portion 146 of a vertical curtain of heated air 148. IBH system 104 may also include a second feed pipe 134 having a first end section 150 that extends to a second end section 152 through an intermediate section 154. Second feed pipe 134 includes a first plurality of openings 156 and an opposing second plurality of openings 158 that, in a manner similar to that described above with respect to first feed pipe 132 establishes a second portion 160 of the vertical curtain of heated air 148.

First and second feed pipes 132 and 134 are coupled in flow communication with compressor discharge extraction manifold 120 via inlet bleed manifold 130. Inlet bleed manifold 130 is coupled in flow communication with, for example, second end section 152 of second feed pipe 134. A connection member (not shown) extends from inlet bleed manifold 130 and is coupled in flow communication to first end section 136 of first feed pipe 132. As such, opposing heated airflows, as indicated by arrows A and B, are passed through first and second conduits 132 and 134. The opposing heated air flows pass through the plurality of openings 142, 144 and 156, 158 to establish the vertical curtain of heated air 148. In an alternative embodiment, the heated airflows may be fed in the same direction, and in any orientation, within first and second conduits 132 and 134. Moreover, IBH system 104 may include any number of feed pipes that enables the system to function as described herein.

Moreover, inlet silencer assembly 112 includes a plurality of silencer panels 162. Each silencer panel 162 includes a tail portion 164 disposed proximate to first feed pipe 132 and second feed pipe 134.

Figure 3:
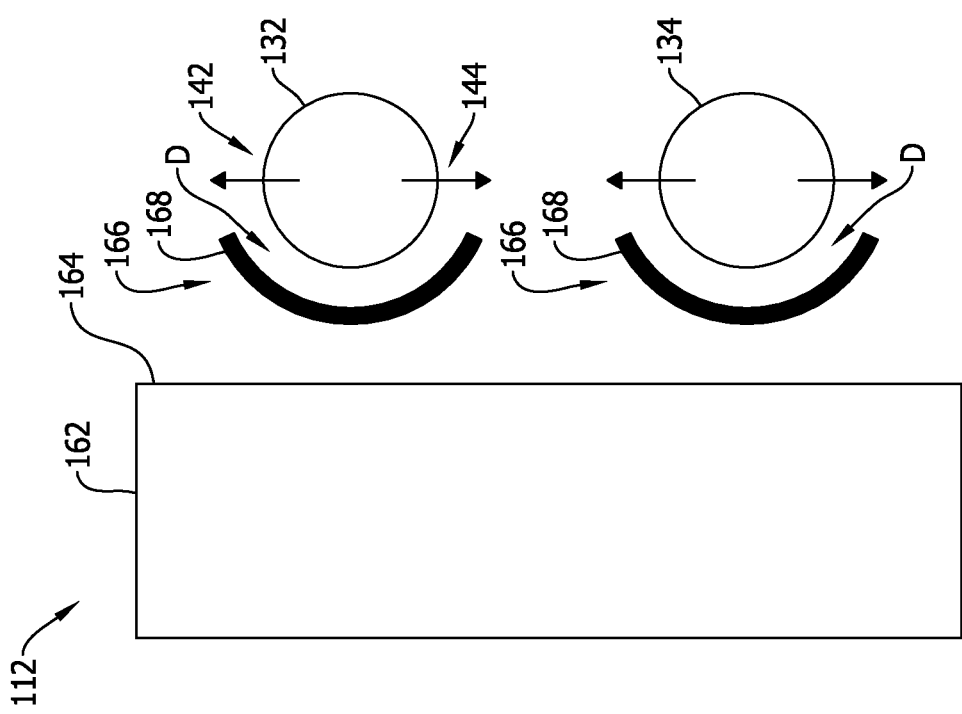
FIG. 3 is a schematic side view of the inlet bleed heat system shown in FIG. 2, in accordance with one embodiment of the disclosure.

FIG. 3 is a schematic side view of IBH system 104, in accordance with one embodiment of the disclosure. In the exemplary embodiment, IBH system 104 includes a heat shielding component 166 that extends across each of first feed pipe 132 and second feed pipe 134. Heat shielding component 166 reduces heat transfer between first feed pipe 132, and second feed pipe 134, and inlet silencer assembly 112. In one embodiment, heat shielding component 166 is an arcuate sheet component 168 that extends about a portion of first feed pipe 132 and second feed pipe 134. More specifically, arcuate sheet component 168 extends about first feed pipe 132 and second feed pipe 134 to the extent that first plurality of openings 142 and second plurality of openings 144 are not blocked by arcuate sheet component 168. As such, first feed pipe 132 and second feed pipe 134 are not restricted from discharging compressor bleed air therefrom. In addition, arcuate sheet component 168 is spaced a distance D from first feed pipe 132 and second feed pipe 134 such that heat radiated therefrom is blocked by arcuate sheet component 168, and such that thermal conductivity between arcuate sheet component 168 and first feed pipe 132 and second feed pipe 134 is limited.

Arcuate sheet component 168 is fabricated from any material that enables IBH system 104 to function as described herein. In one embodiment, the material used to fabricate arcuate sheet component 168 is a metallic material having a thermal conductivity less than a predetermined threshold. An example material used to fabricate arcuate sheet component 168 includes, but is not limited to, aluminum and stainless steel.

Figure 4:
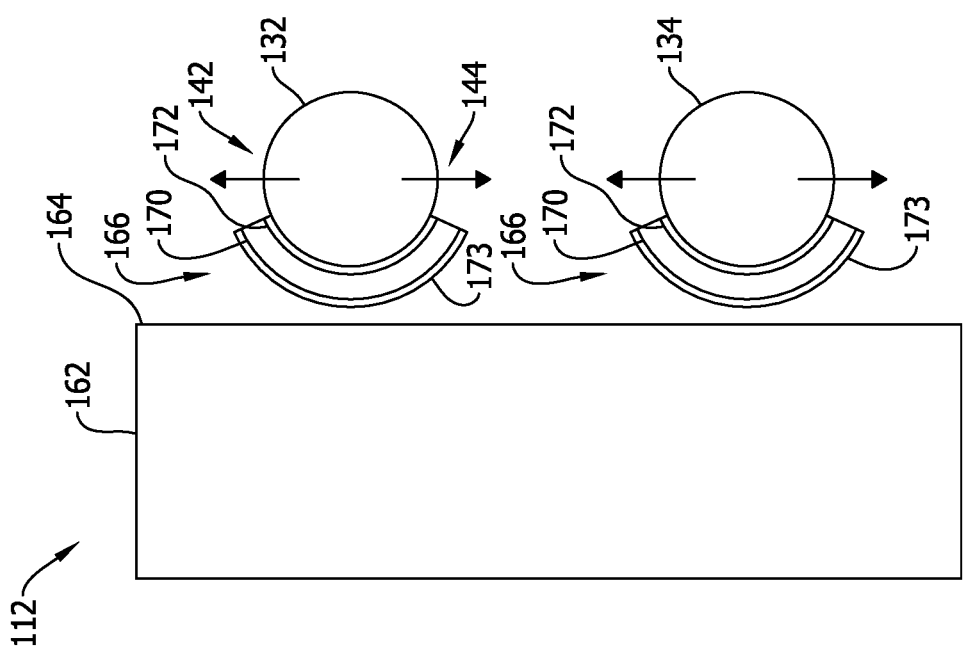
FIG. 4 is a schematic side view of the inlet bleed heat system shown in FIG. 2, in accordance with another embodiment of the disclosure.

FIG. 4 is a schematic side view of IBH system 104, in accordance with another embodiment of the disclosure. In the exemplary embodiment, heat shielding component 166 includes a layer 170 of thermal insulating material that extends about a portion of first feed pipe 132 and second feed pipe 134. Layer 170 of thermal insulating material is positioned between first feed pipe 132, and second feed pipe 134, and inlet silencer assembly 112. Layer 170 of thermal insulating material extends about first feed pipe 132 and second feed pipe 134 to the extent that first plurality of openings 142 and second plurality of openings 144 are not blocked by layer 170 of thermal insulating material. As such, first feed pipe 132 and second feed pipe 134 are not restricted from discharging compressor bleed air therefrom.

In one embodiment, layer 170 of thermal insulating material is a blanket-type insulation coupled to first feed pipe 132 and second feed pipe 134. The blanket-type insulation may be fabricated from any material that enables IBH system 104 to function as described herein. An example material used to fabricate the blanket-type insulation includes, but is not limited to, a glass wool material.

In addition, in one embodiment, layer 170 of thermal insulating material includes a thermal barrier coating 172 deposited on a portion of first feed pipe 132 and second feed pipe 134. More specifically, thermal barrier coating 172 is positioned between first feed pipe 132, and second feed pipe 134, and inlet silencer assembly 112. Moreover, thermal barrier coating 172 is positioned between first feed pipe 132, and second feed pipe 134, and layer 170 of thermal insulating material. As such, thermal barrier coating 172 facilitates reducing thermal conductivity between layer 170 of thermal insulating material and first feed pipe 132 and second feed pipe 134. In one embodiment, IBH system 104 further includes an outer cover 173 that facilitates protecting layer 170 of thermal insulating material from erosion caused by airflow channeled through the feed pipes.

Figure 5:
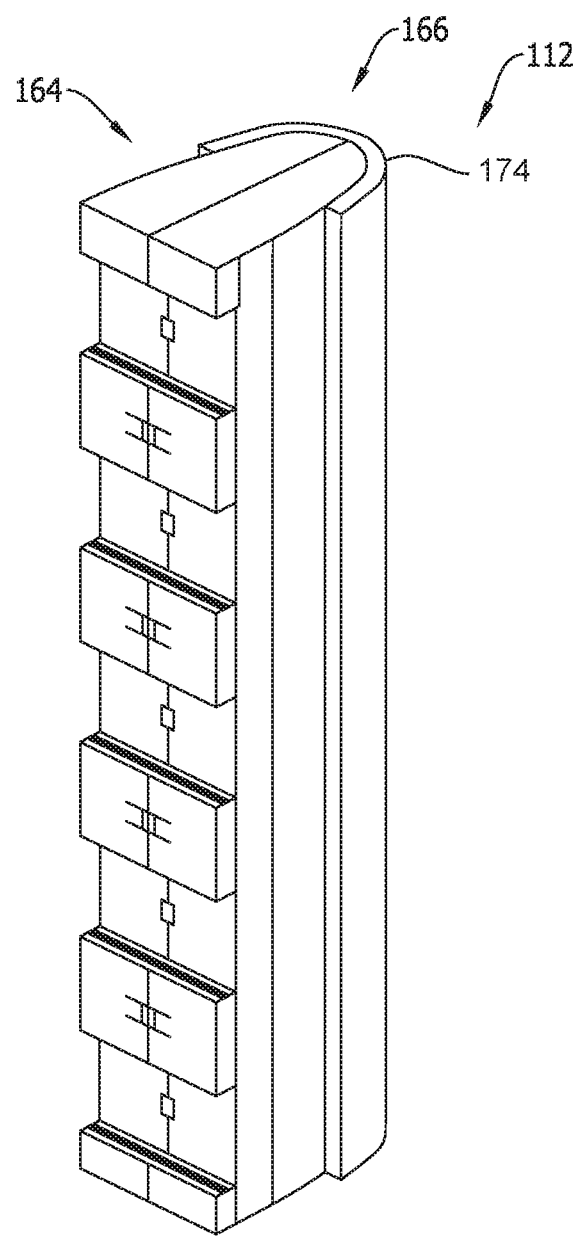
FIG. 5 is a perspective view of a portion of a silencer assembly shown in FIG. 2.

FIG. 5 is a perspective view of a portion of inlet silencer assembly 112 (shown in FIG. 2). As noted above, inlet silencer assembly 112 includes a plurality of silencer panels 162 (shown in FIG. 2), and each silencer panel 162 includes a tail portion 164. In the exemplary embodiment, tail portion 164 includes heat shielding component 166 coupled to, or formed integrally with, tail portion 164. Moreover, heat shielding component 166 is oriented relative to tail portion 164 such that heat shielding component 166 is positioned between tail portion 164 and first feed pipe 132 and second feed pipe 134 (shown in FIG. 2). As such, heat shielding component 166 facilitates restricting heat transfer between tail portion 164 and first feed pipe 132 and second feed pipe 134.

In the exemplary embodiment, heat shielding component 166 is shaped to match the contours of tail portion 164. For example, in one embodiment, heat shielding component 166 is an arcuate sheet component 174 that extends about a portion of tail portion 164 such that arcuate sheet component 174 is positioned between tail portion 164 and first feed pipe 132 and second feed pipe 134. In an alternative embodiment, heat shielding component 166 is a layer of thermal insulating material, similar to layer 170 of thermal insulating material described above.

In one embodiment, tail portion 164 is formed from a first material and heat shielding component 166 is formed from a second material different from the first material. The first material is any material that enables IBH system 104 to function as described herein. An example first material includes, but is not limited to, a thermoplastic material. In addition, heat shielding component 166 is fabricated from any material that enables IBH system 104 to function as described herein. In one embodiment, the second material used to fabricate heat shielding component 166 is a metallic material having a thermal conductivity less than a predetermined threshold. An example material used to fabricate heat shielding component 166 includes, but is not limited to, aluminum and stainless steel.

Exemplary embodiments of an inlet bleed heat system and a heat shielding component for protecting a silencer panel are described herein. The embodiments include a heat shielding component positioned between feed pipes of the inlet bleed heat system and a tail portion of each silencer panel in an inlet silencer assembly. The heat shielding component facilitates restricting heat transfer between the feed pipes and the silencer panels. The heat shielding component may be fabricated from, and embodied as, a metallic heat shield, or embodied as a layer of thermal insulating material. Positioning the heat shielding component between the feed pipes and the tail portion of the silencer panels facilitates protecting and increasing the service life of silencer panels fabricated from thermoplastic material.

While the disclosure has been described in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the scope of the disclosure. For example, components of each system and/or steps of each method may be used and/or practiced independently and separately from other components and/or steps described herein. Additionally, while various embodiments of the disclosure have been described, it is to be understood that aspects of the disclosure may include only some of the described embodiments, and that each component and/or step may also be used and/or practiced with other systems and methods. Accordingly, the disclosure is not to be seen as limited by the foregoing description, but is only limited by the scope of the appended claims.

Although specific features of various embodiments of the disclosure may be shown in some drawings and not in others, this is for convenience only. Moreover, references to "one embodiment" or "an embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. An inlet bleed heat (IBH) system for use in a turbine engine including a silencer assembly, the IBH system comprising:

a feed pipe for delivering compressor discharge air, said feed pipe having a circumference and comprising a plurality of orifices along a first portion of a length of said feed pipe, said plurality of orifices located within at least one first circumferential portion of the circumference of said feed pipe, each orifice of said plurality of orifices extending through a wall of said feed pipe for enabling the compressor discharge air to exit said feed pipe; and a heat shielding component that extends along said first portion of the length and circumferentially across only a second circumferential portion of said feed pipe, said heat shielding component configured to reduce heat transfer between said feed pipe and the silencer assembly of the turbine engine, wherein said second circumferential portion does not overlap said at least one first circumferential portion, and wherein said second circumferential portion is less than half the circumference of said feed pipe.

2. The IBH system in accordance with claim 1, wherein said heat shielding component comprises an arcuate sheet component extending about said second circumferential portion of said feed pipe, and positioned between said feed pipe and the silencer assembly.

3. The IBH system in accordance with claim 2, wherein said arcuate sheet component comprises aluminum or stainless steel.

4. The IBH system in accordance with claim 1, wherein said heat shielding component comprises a layer of thermal insulating material extending about said second circumferential portion of said feed pipe, and positioned between said feed pipe and the silencer assembly.

5. The IBH system in accordance with claim 4, wherein said layer of thermal insulating material comprises a blanket-type insulation.

6. The IBH system in accordance with claim 4 further comprising an outer cover extending about said layer of thermal insulating material.

7. The IBH system in accordance with claim 4, wherein said layer of thermal insulating material comprises a thermal barrier coating deposited on said second circumferential portion of said feed pipe, wherein said thermal barrier coating is positioned between said feed pipe and the silencer assembly.

8. A turbine engine comprising:
a compressor comprising a discharge extraction manifold; and
an inlet housing coupled in flow communication with said compressor, said inlet housing comprising:
an inlet silencer assembly; and
an inlet bleed heat (IBH) system comprising:
a feed pipe coupled in flow communication with said discharge extraction manifold, said feed pipe having a first circumferential portion facing towards said inlet silencer assembly and a second circumferential portion facing away from said inlet silencer assembly, said second circumferential portion of said feed pipe having a plurality of orifices for delivering compressor discharge air; and
a heat shielding component coupled to said feed pipe said heat shielding component configured to reduce heat transfer between said feed pipe and said inlet silencer assembly of the turbine engine, wherein said heat shielding component extends circumferentially from a first circumferential side to a second circumferential side over a circumferential width, and wherein the circumferential width is situated between said first circumferential portion and said inlet silencer assembly.

9. The turbine engine in accordance with claim 8, wherein said heat shielding component comprises an arcuate sheet component extending about a portion of said feed pipe.

10. The turbine engine in accordance with claim 9, wherein said arcuate sheet component comprises aluminum or stainless steel.

11. The turbine engine in accordance with claim 8, wherein said heat shielding component comprises a layer of thermal insulating material extending about a portion of said feed pipe, and positioned between said feed pipe and the silencer assembly.

12. The turbine engine in accordance with claim 11, wherein said layer of thermal insulating material comprises a blanket-type insulation.

13. The turbine engine in accordance with claim 12, wherein said blanket-type insulating material comprises glass wool.

14. The turbine engine in accordance with claim 11, wherein said layer of thermal insulating material comprises a thermal barrier coating deposited on a portion of said feed pipe, wherein said thermal barrier coating is positioned between said feed pipe and said inlet silencer assembly.

\* \* \* \* \*